(12) United States Patent
Lambert

(10) Patent No.: US 10,929,552 B2
(45) Date of Patent: Feb. 23, 2021

(54) DRIVER CONSENT MANAGEMENT

(71) Applicant: Lytx, Inc., San Diego, CA (US)

(72) Inventor: Daniel Lambert, Carlsbad, CA (US)

(73) Assignee: Lytx, Inc., San Diego, CA (US)

( * ) Notice: Subject to any disclaimer, the term of this patent is extended or adjusted under 35 U.S.C. 154(b) by 326 days.

(21) Appl. No.: 14/823,937

(22) Filed: Aug. 11, 2015

(65) Prior Publication Data
US 2017/0046528 A1 Feb. 16, 2017

(51) Int. Cl.
| | | |
|---|---|---|
| *H04N 5/77* | (2006.01) | |
| *H04N 5/775* | (2006.01) | |
| *G06F 3/0481* | (2013.01) | |
| *G06F 21/62* | (2013.01) | |
| *G07C 5/08* | (2006.01) | |
| *H04N 9/82* | (2006.01) | |

(52) U.S. Cl.
CPC ....... *G06F 21/6218* (2013.01); *G07C 5/0891* (2013.01); *H04N 5/77* (2013.01); *H04N 5/772* (2013.01); *H04N 9/8205* (2013.01)

(58) Field of Classification Search
CPC ........ G06Q 10/06; G06Q 10/103; H60Q 1/00; H04N 5/225; H04N 5/77; H04N 5/772; H04N 9/8205; G06F 21/6218; G07C 5/0891

USPC ........ 340/439; 705/318, 2; 701/35; 348/372, 348/148

See application file for complete search history.

(56) References Cited

U.S. PATENT DOCUMENTS

| | | | |
|---|---|---|---|
| 2010/0049438 A1* | 2/2010 | Hu | G01C 21/26 701/469 |
| 2010/0127843 A1 | 5/2010 | Koenig | |
| 2010/0238009 A1 | 9/2010 | Cook et al. | |
| 2011/0137518 A1* | 6/2011 | Abe | G07C 5/085 701/33.4 |
| 2011/0143776 A1* | 6/2011 | Shankaranarayanan | G06Q 10/06 455/456.3 |
| 2011/0213723 A1* | 9/2011 | Burroughs | G06Q 10/06 705/318 |
| 2012/0323590 A1* | 12/2012 | Udani | G06Q 10/103 705/2 |
| 2013/0088639 A1* | 4/2013 | Mundt | H04N 5/2251 348/372 |
| 2015/0088335 A1 | 3/2015 | Lambert et al. | |
| 2015/0203126 A1 | 7/2015 | Kobana et al. | |

* cited by examiner

*Primary Examiner* — Albert Kir
(74) *Attorney, Agent, or Firm* — Van Pelt, Yi & James LLP

(57) ABSTRACT

A system for checking consent includes an input interface and a processor. The input interface is to receive a start indication of a driver shift start. The processor is to determine a driver for the driver shift; determine whether a consent is stored for the driver; and in the event a consent is stored for the driver, store a transfer indication.

21 Claims, 9 Drawing Sheets

DRIVER CONSENT MANAGEMENT

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Some vehicle event recorder systems include both an outward-facing camera (e.g., to capture images of the road) and an inward-facing camera (e.g., to capture images of the driver). In some circumstances, images of the driver should not be recorded and/or transmitted. In some circumstances, images of the driver should only be recorded and/or transmitted in the event the driver has provided a consent to be recorded.

BRIEF DESCRIPTION OF THE DRAWINGS

Various embodiments of the invention are disclosed in the following detailed description and the accompanying drawings.

DETAILED DESCRIPTION

Figure 1:
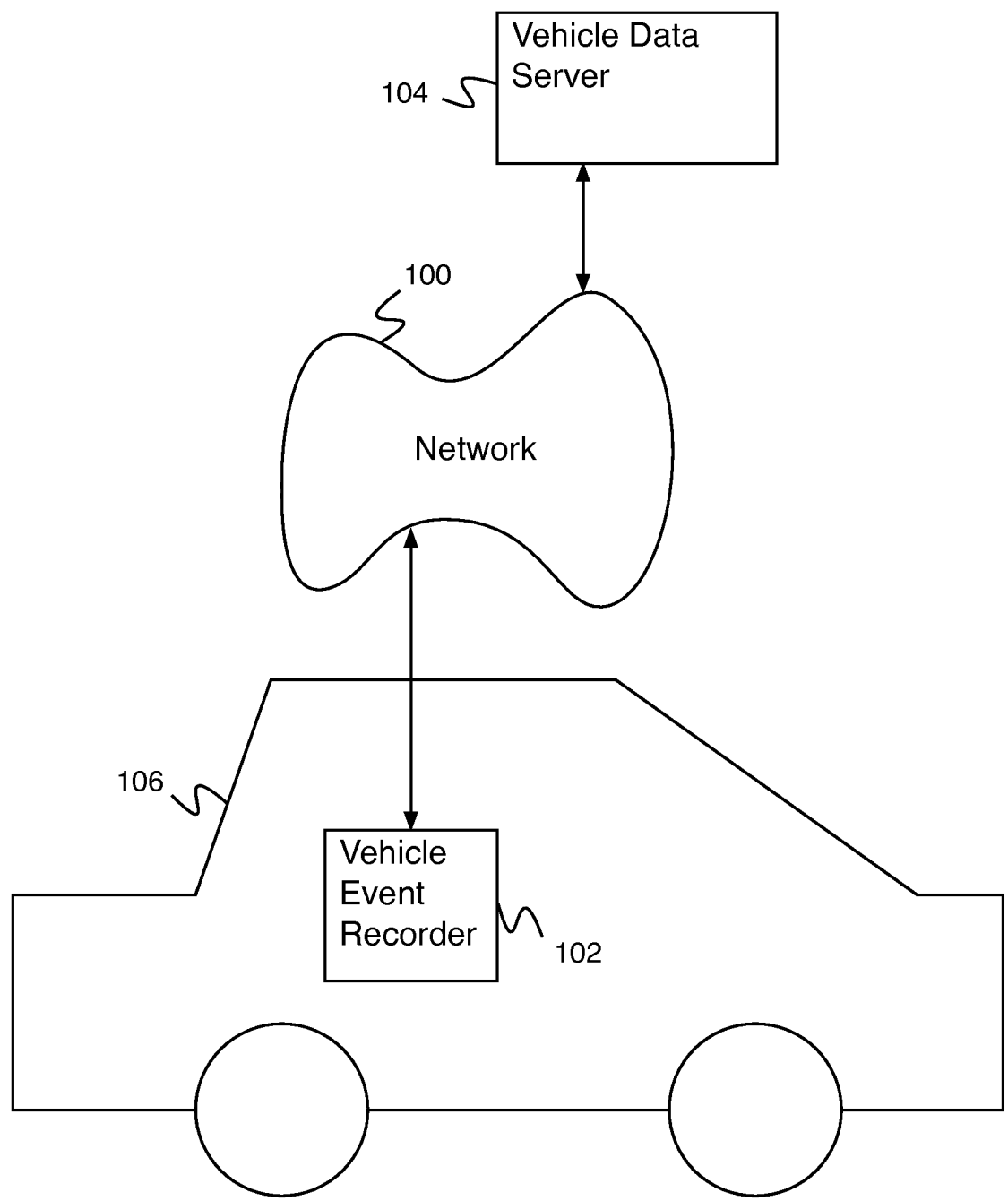
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for checking consent is disclosed. The system comprises an input interface and a processor. The input interface is for receiving a start indication of a driver shift start. The processor is for: determining a driver for the driver shift; determining whether a consent is stored for the driver; and in the event a consent is stored for the driver, storing a transfer indication. The system for checking a consent additionally comprises a memory coupled to the processor and configured to provide the processor with instructions. In various embodiments, consent comprises video consent, audio consent, video and audio consent, or any other appropriate consent.

In some embodiments, a system for checking video and/or audio consent comprises a vehicle event recorder including an inward-facing camera. The inward-facing camera is configured to record driver images or driver video or driver audio. In some embodiments, the inward-facing camera is configured to record driver images or driver video or driver audio in case of an anomalous event, e.g., a sudden stop or a hard turn. In some embodiments, the inward-facing camera is configured to temporarily record driver images or driver video at a predetermined rate (e.g., an image every 10 seconds, 5 seconds of video every 20 seconds, continuous video, etc.) or driver audio and permanently store the driver images or driver video or driver audio only in case of an anomalous event. In some situations (e.g., in some countries, in some fields of employment, etc.) driver images or driver video or driver audio can only be recorded in the event that the driver has provided a consent to be recorded. In some embodiments, a consent to be recorded comprises a recording (e.g., an audio or video recording) of the driver reading the text of a consent to be recorded. The system for checking video and/or audio consent receives an indication of a driver shift start (e.g., a new driver starting his shift), determines whether the driver has provided a consent, and stores an indication of whether or not to store and transmit video and/or audio (e.g., the system only stores an indication to store and transmit video if the driver has provided the consent). In some embodiments, determining whether the driver has provided a consent comprises contacting a server (e.g., a vehicle data server) and determining whether a consent has been stored on the server. The system additionally comprises a mechanism for recording a consent. The system receives an indication to record a consent (e.g., the driver pushing a button on the vehicle event recorder, etc.) and provides a consent content to the driver (e.g., a script to read, an audio cue, etc.) and an indication to begin recording (e.g., a light indicator, a text indicator, an audio indicator, etc.). The driver says the consent content and provides an indication that the consent has been completed. The consent is then uploaded to the vehicle data server, checked to verify the consent (e.g., that the driver said the correct words, included the appropriate content, etc.) and stored (e.g., in a memory, in a database, associated with a driver identifier (ID), with metadata—for example, date, vehicle, location, country, etc.). In some embodiments, a consent is location specific (e.g., a different consent is required in different locations, e.g., different countries). In some embodiments, in the event that a recorded consent is stored by the vehicle data server it is associated with a region, and in the event that a driver consent is checked, a consent associated with the driver's current region is checked for.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, global positioning sensor (GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a code division multiple access (CDMA) network, a global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, a fleet maintenance facility, a fleet storage facility, etc.). In various embodiments, vehicle data server 104 is located at a colocation center (e.g., a data center where equipment, space and bandwidth are available for rental), at a cloud service provider, or any other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for managing a camera.

Figure 2:
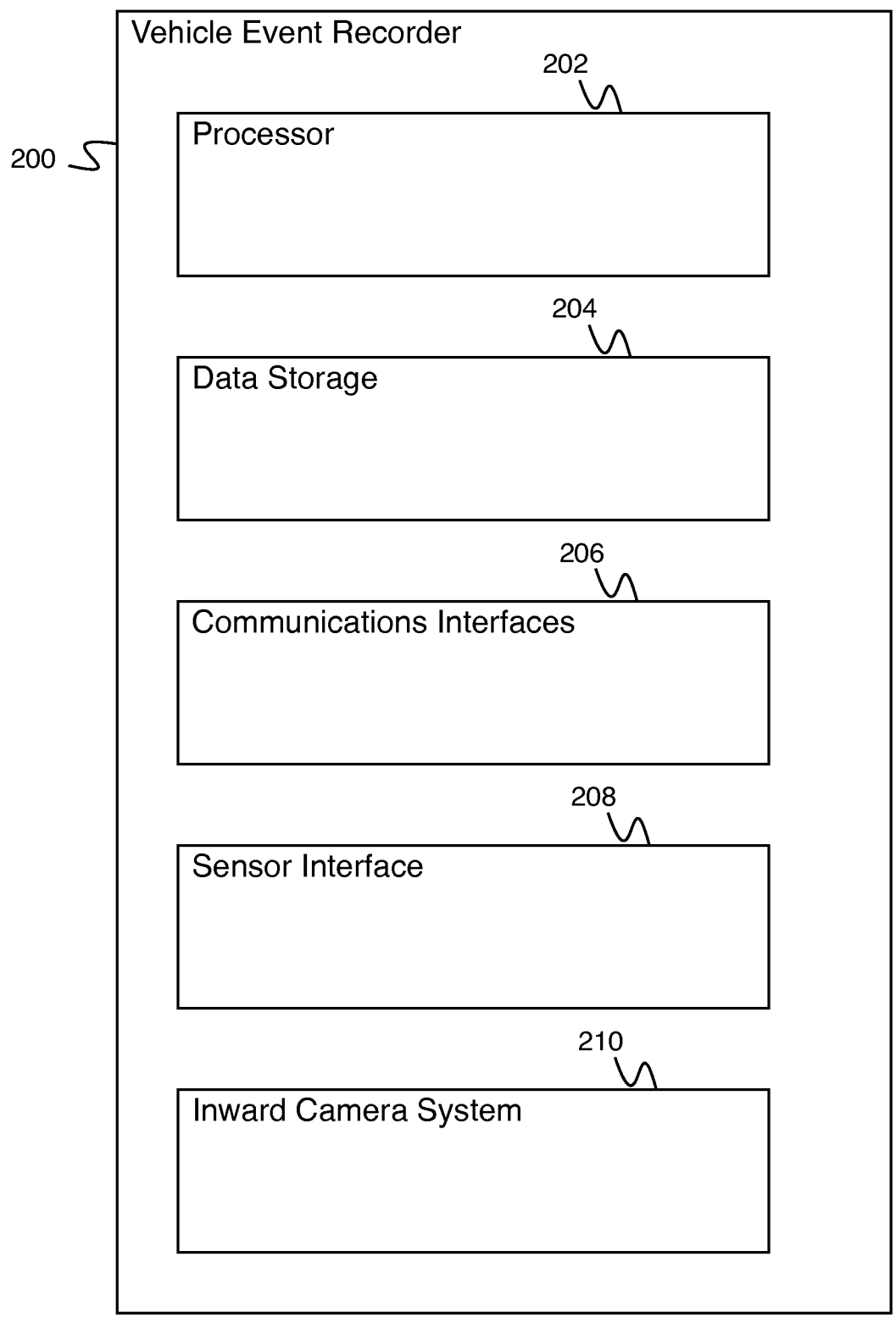
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, for determining a position using global positioning system 208, and for reading data via sensor interface 208. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, map data, a transfer indication, a non-transfer indication, or any other appropriate data. In various embodiments, the transfer indication or a non-transfer indication is on the vehicle event recorder, the vehicle data server, or both. In some embodiments, for the backend, the interior video and audio is temporarily stored until vehicle event recorder check-in to the vehicle data server where the transfer/non-transfer indication is checked. In some embodiments, in the event that there is a transfer indication, all content transfers, and in the event that there is a non-transfer indication, the content is deleted. In various embodiments, communications interfaces 206 comprises one or more of a GSM interface, a CDMA interface, a LTE interface, a UMTS interface, a WiMAX interface, a DSRC interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via OBD bus. Inward camera system 210 comprises a system for managing an inward camera system. In various embodiments, inward camera system 210 comprises a system for recording inward-facing video, a system for opening or closing a shutter, a system for storing video, a system for transmitting video, a system for recording consent data, a system for determining whether a consent has been recorded, a system for determining whether to open a shutter, a system for determining whether to temporarily store video, a system for determining whether to permanently store video, a system for determining whether to transmit video, or a system for any other appropriate purpose.

Figure 3:
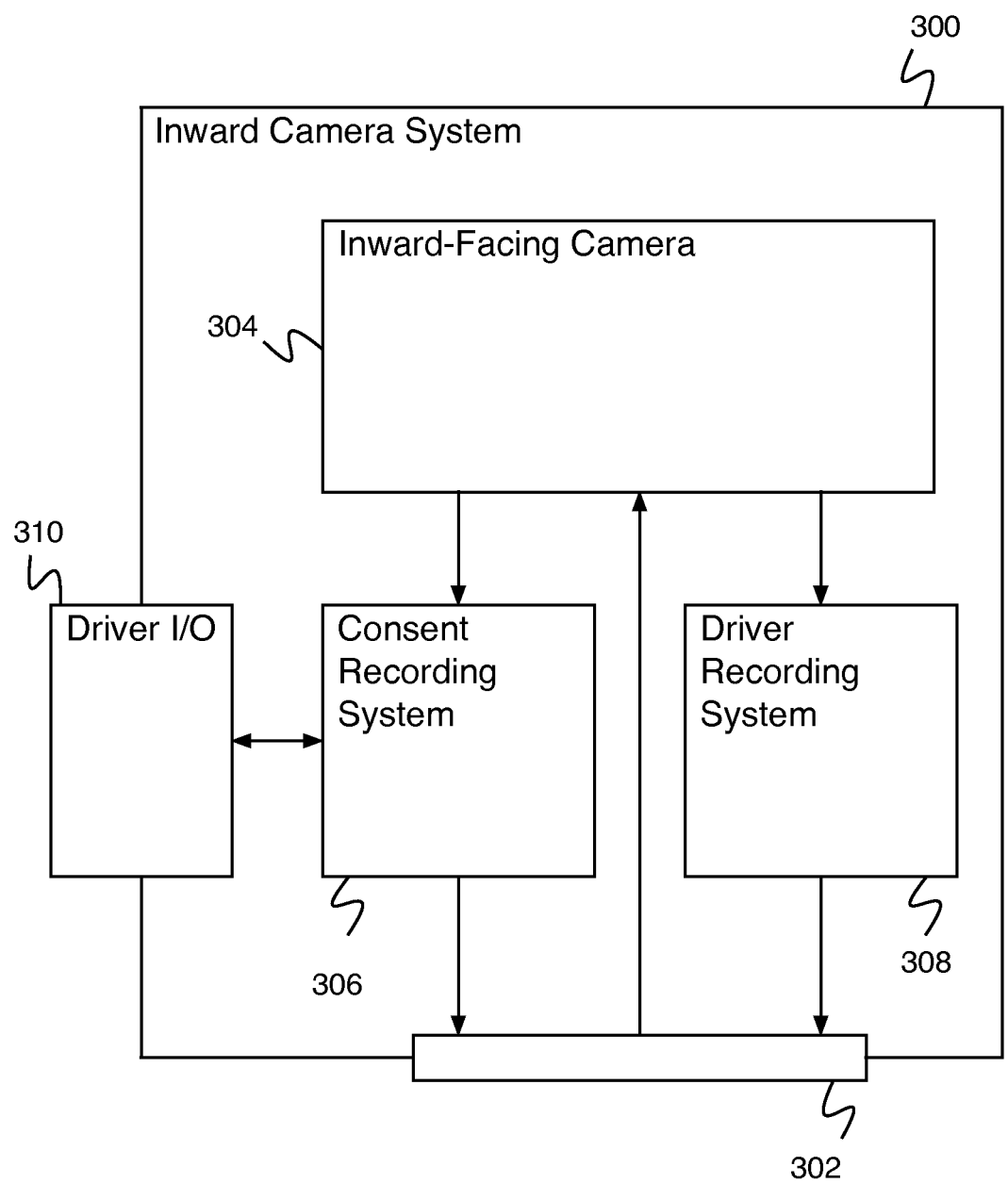
FIG. 3 is a block diagram illustrating an embodiment of an inward camera system.

FIG. 3 is a block diagram illustrating an embodiment of an inward camera system. In some embodiments, inward camera system 300 of FIG. 3 comprises inward camera system 210 of FIG. 2. In the example shown, inward camera system 300 comprises inward-facing camera 304 for capturing inward-facing video. In some embodiments, inward-facing video comprises video facing inwards in a vehicle, e.g., video showing the driver of a vehicle. In the example shown, inward-facing camera 304 is coupled to shutter 302. In various embodiments, the system has a mechanical shutter or a virtual shutter (e.g., record and then delete or not delete depending on the virtual shutter setting). Shutter 302 comprises a shutter for mechanically opening and closing the view of inward-facing camera 304. In some embodiments, when shutter 302 is closed, inward-facing camera 304 receives no inward-facing images. In the example shown, shutter 302 receives opening and/or closing indications from consent recording system 306 and driver recording system 308. Consent recording system 306 comprises a system for recording a driver consent. In some embodiments, consent recording system 306 comprises a system for recording a driver consent using inward-facing camera 304. In some embodiments, consent recording system 306 communicates with driver I/O (e.g., input/output) 310 for providing and receiving indications for recording a driver consent. In some embodiments, a driver consent comprises a consent to be recorded (e.g., by inward-facing camera 304, e.g., while driving). In various embodiments, driver I/O 310 comprises a button (e.g., for receiving an indication to record a consent, for receiving an indication that a consent is completed, etc.), a display (e.g., for displaying a consent content, for displaying an indication to start consent, etc.), an audio recorder (e.g., for recording a consent audio), a local wireless communication system (e.g., Bluetooth™, Zigbee™, etc.) for communicating with an external input/output device), or any other appropriate driver I/O system. In some embodiments, consent recording system 306 receives an indication to record a driver consent (e.g., from a driver) and provides a consent content and an indication to start recording the consent (e.g., to the driver). The consent is then recorded (e.g., by inward facing camera 304, by an audio recorder, etc.). In some embodiments, when the consent is completed, the driver makes an indication to a button (e.g., a button of driver I/O 310). In some embodiments, while the consent is being recorded, consent recording system 306 provides a shutter open indication to shutter 302.

In some embodiments, after a consent is recorded, it is uploaded to a server (e.g., vehicle data server 104 of FIG. 1). In some embodiments, consent recording system 306 is implemented using a processor. Driver recording system 308 comprises a system for recording a driver (e.g., using inward facing camera 304). In some embodiments, driver recording system 308 comprises a system for determining whether a consent has been recorded (e.g., an audio sensor for converting spoken sound to electrical impulses that are digitized and stored, a processor for examining the digitized and stored sound to determine whether words or the consent have/has been stored, etc.). In some embodiments, in the event that it has been determined that consent has not been provided, driver recording system 308 prompts the driver to provide the consent again. In various embodiments, in the event that the system prompts more than a predetermined number of times, the system waits until later and tries again, stops trying for a consent, stores an indication that the consent was not recorder, provides an indication to a server, or any other appropriate next step. In some embodiments, determining whether a consent has been recorded comprises determining whether a consent has been uploaded to a server. In some embodiments, determining whether a consent has been recorded comprises determining whether a transfer indication is stored. In various embodiments, in the event driver recording system 308 determines that a consent has been recorded, driver recording system 308 provides a shutter open indication to shutter 302, driver recording system 308 stores video temporarily, driver recording system 308 stores video permanently, driver recording system 308 transfers video, or driver recording system 308 performs any other appropriate driver recording system action. In some embodiments, driver recording system 308 is implemented using a processor. In various embodiments, consent recording system 306 and driver recording system 308 are implemented on the same processor or on separate processors. In some embodiments, one or more of consent recording system 306 and driver recording system 308 are implemented using processor 202 of FIG. 2. In some embodiments, one or more processors used to implement the elements of FIG. 3 are coupled to a memory configured to provide the one or more processors with instructions. In various embodiments, the memory comprises a random access memory (RAM), a read only memory (ROM), a nonvolatile memory, a flash memory, a hard disk, or any other appropriate memory. In some embodiments, the memory comprises data storage 204 of FIG. 2.

Figure 4:
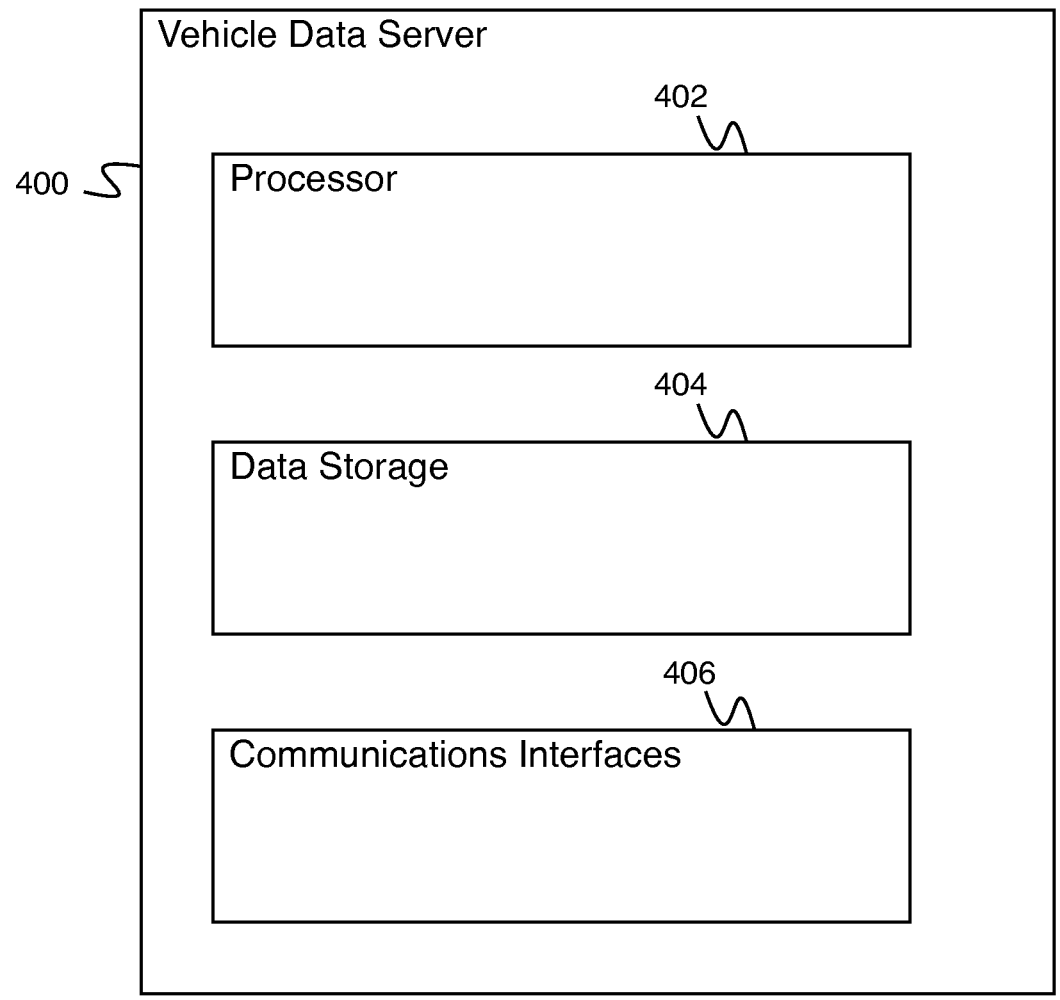
FIG. 4 is a block diagram illustrating an embodiment of a vehicle data server.

FIG. 4 is a block diagram illustrating an embodiment of a vehicle data server. In some embodiments, vehicle data server 400 comprises vehicle data server 104 of FIG. 1. In the example shown, vehicle data server 400 comprises processor 402. In some embodiments, processor 402 comprises a processor for evaluating consent data (e.g., determining whether consent data comprises a valid consent). In some embodiments, processor 402 determines whether consent data comprises a valid consent by automatically analyzing the consent data (e.g., identifying the words spoken in the consent data and determining whether the words comprise the correct words for the consent). In some embodiments, processor 402 determines whether consent data comprises a valid consent by providing the consent to a consent reviewer (e.g., a separate system, a separate module, etc.) and receiving a consent determination. In some embodiments, processor 402 comprises a processor for determining a driver identifier (e.g., a driver ID associated with a consent data). In various embodiments, a driver ID is determined using one or more of a driver log, a vision system, a driver ID card, a voice recognition system, or any other appropriate driver information. Data storage 404 comprises a data storage (e.g., a random access memory (RAM), a read only memory (ROM), a nonvolatile memory, a flash memory, a hard disk, or any other appropriate data storage). In various embodiments, data storage 404 comprises a data storage for storing instructions for processor 402, vehicle event recorder data, vehicle event data, sensor data, video data, map data, or any other appropriate data. In various embodiments, communications interfaces 406 comprises one or more of a GSM interface, a CDMA interface, a LTE interface, a UMTS interface, a WiMAX interface, a DSRC interface, a WiFi interface, an Ethernet interface, a USB interface, a Bluetooth interface, an Internet interface, a fiber optic interface, or any other appropriate interface.

Figure 5:
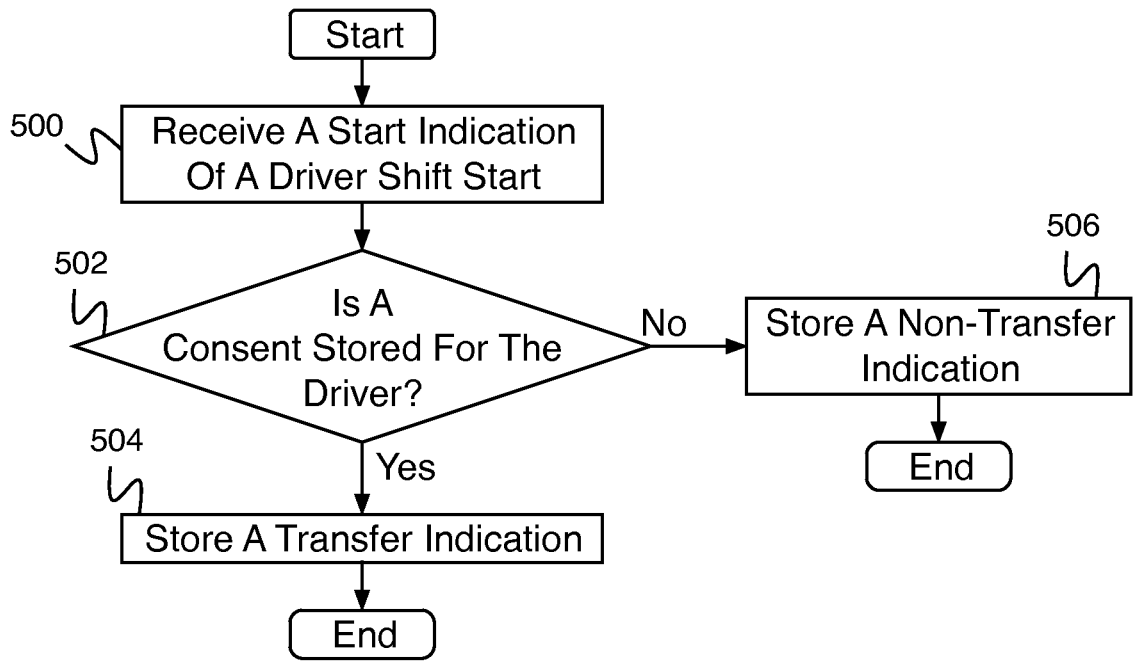
FIG. 5 is a flow diagram illustrating an embodiment of a process for checking video consent.

FIG. 5 is a flow diagram illustrating an embodiment of a process for checking video consent. In some embodiments, the process of FIG. 5 is executed by a vehicle event recorder (e.g., vehicle event recorder 200 of FIG. 2). In the example shown, in 500, a start indication of a driver shift start is received. In some embodiments, the start indication is received from a vehicle data server (e.g., vehicle data server 104 of FIG. 1). In some embodiments, the start indication is received from a sensor interface (e.g., ignition cycle). In 502, it is determined whether a consent is stored for the driver. In some embodiments, it is determined whether a consent is stored for the driver by determining whether a driver consent flag is stored on the vehicle event recorder. In some embodiments, the consent comprises a consent for the driver for the current driver region. In some embodiments, separate consent flags are stored for a plurality of regions (e.g., a plurality of countries, localities, etc.). In some embodiments, a consent flag is stored associated with an indication of the region name. In some embodiments, it is determined whether a consent is stored for the driver by querying the vehicle data server for a consent stored for the driver. In the event it is determined that a consent is stored for the driver, control passes to 504. In the event it is determined that a consent is not stored for the driver, control passes to 506. In 506, a non-transfer indication is stored, and the process ends. In 504, a transfer indication is stored.

Figure 6:
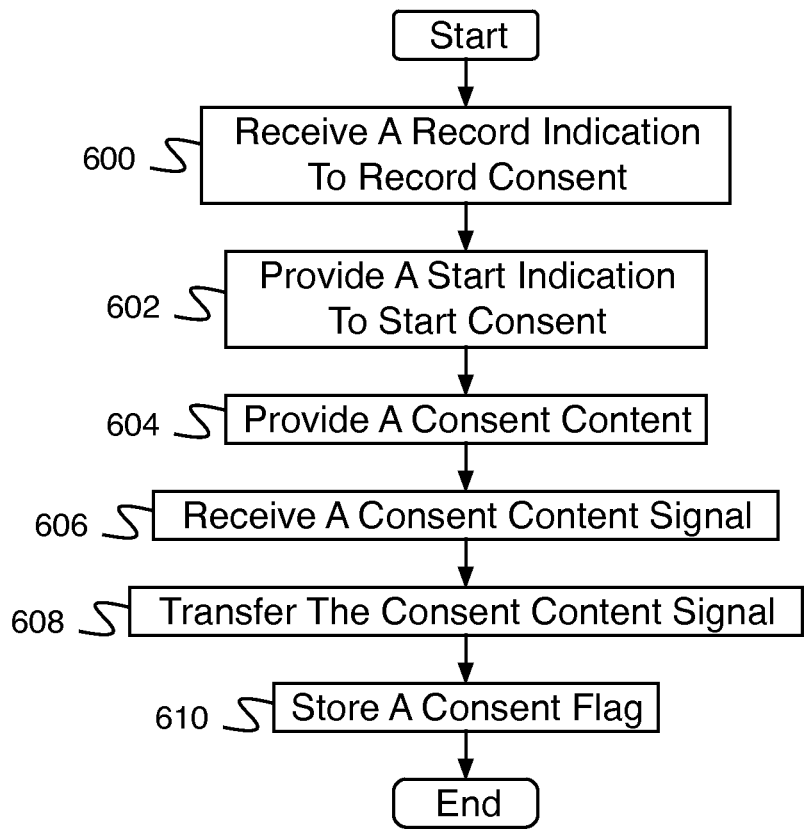
FIG. 6 is a flow diagram illustrating an embodiment of a process for recording a consent.

FIG. 6 is a flow diagram illustrating an embodiment of a process for recording a consent. In some embodiments, the process of FIG. 6 is performed by consent recording system 306 of FIG. 3. In the example shown, in 600, a record indication to record consent is received. In various embodiments, a record indication to record consent comprises a button push, a special button push (e.g., a double button push, a long button push, a long button push followed by a short button push, etc.), an indication to an external device (e.g., a smartphone communicating with the consent recording system via a wired or wireless connection), or any other appropriate record indication. In 602, a start indication to start consent is provided. In various embodiments, a start indication comprises a blinking light, start indication display, an audio start indication, or any other appropriate start indication. In 604, a consent content is provided. In some embodiments, the consent content comprises a text to be read by a driver. In some embodiments, a recording of a driver speaking the text of the consent content comprises a consent. In some embodiments, the consent content is specific to a region (e.g., a country, a state, a city, etc.). In 606, a consent content signal is received. In some embodiments, a consent content signal comprises a video signal of a driver speaking the text of the consent content. In some embodiments, a consent content signal comprises an audio signal of a driver speaking the text of the consent content. In some embodiments, the consent content signal is stored. In 608, the consent content signal is transferred. In some embodiments, the consent content signal is transferred to a vehicle data server (e.g., vehicle data server 104 of FIG. 1). In some embodiments, the consent content signal is stored on a server. In 610, a consent flag is stored. In various embodiments, a consent flag comprises an indication that a consent has been stored in the vehicle event record, in the vehicle data server, in both, or in any other appropriate location.

In some embodiments, the consent content is stored in a compressed form—for example, the digitized audio signal is processed to compress the storage requirements prior to storing, transmitting to server, processing for content determination, or any other appropriate processing.

Figure 7:
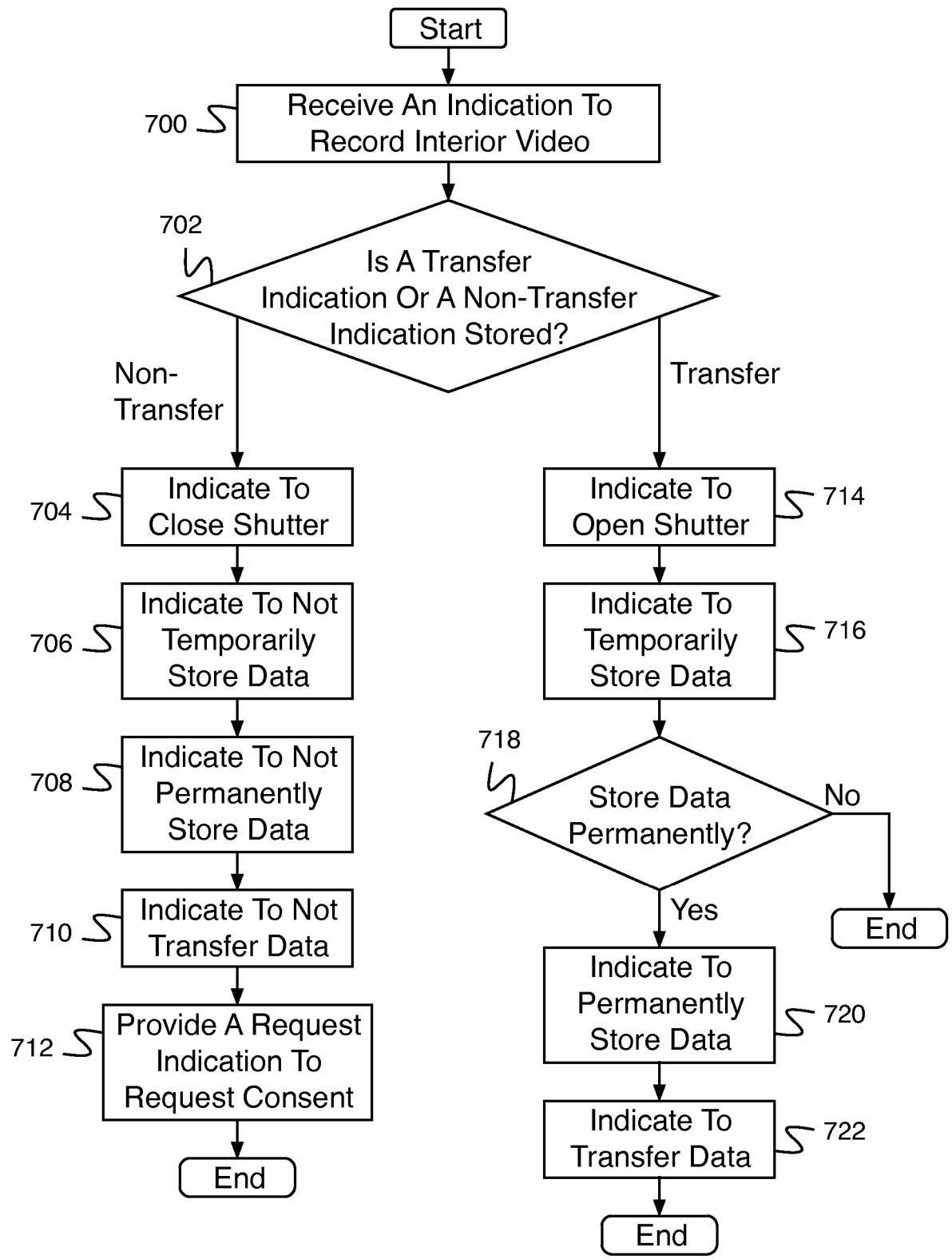
FIG. 7 is a flow diagram illustrating an embodiment of a process for determining whether to transfer data.

FIG. 7 is a flow diagram illustrating an embodiment of a process for determining whether to transfer data. In some embodiments, the process of FIG. 7 is executed by an inward camera system (e.g., inward camera system 300 of FIG. 3). In the example shown, in 700, an indication to record interior video is received. In some embodiments, the indication to record interior video is received from a processor of a vehicle event recorder (e.g., processor 202 of FIG. 2). In some embodiments, interior video is recorded on a schedule (e.g., once per minute, once per 10 seconds, etc.). In some embodiments, interior video is recorded in response to a driving event (e.g., a sudden stop, a hard cornering event, etc.). In the example shown, in 702, it is determined whether a transfer indication or a non-transfer indication is stored. In some embodiments, a transfer indication indicates interior video is able to be transferred. In some embodiments, a non-transfer indication indicates interior video is not able to be transferred. In the event it is determined that a transfer indication is stored, control passes to 714. In the event it is determined that a non-transfer indication is stored, control passes to 704. In 704, the process indicates to close a shutter (e.g., shutter 302 of FIG. 3). In some embodiments, in the event that there is no mechanical shutter, step 704 is omitted. In 706, the process indicates to not temporarily store data (e.g., interior video data). In 708, the process indicates to not permanently store data. In 710, the process indicates to not transfer data. In some embodiments, in the event that there is a mechanical shutter, steps 706, 708, 710 are omitted. In 712, a request indication to request consent is provided, and the process ends. In some embodiments, a request indication to request consent comprises an indication to the driver requesting the driver provide consent to be recorded. In 714, the process indicates to open the shutter. In some embodiments, in the event that there is no mechanical shutter, step 714 is omitted. In 716, the process indicates to temporarily store data. In some embodiments, interior video data is recorded and temporarily stored until a determination is made whether to store it permanently. In 718, it is determined whether to store data permanently. In some embodiments, data is stored permanently in the event an anomalous event (e.g., a hard stop, a hard corner, etc.) has occurred to associate with the video data. In the event it is determined not to store the data permanently, the process ends. In the event it is determined to store the data permanently, control passes to 720. In 720, the process indicates to permanently store the data. In 722, the process indicates to transfer the data.

In some embodiments, the transfer indication is indeterminate (e.g., because it is determined on the backend), and in this case all the content is stored on the device until the indeterminacy is resolved (e.g., the determination of consent and/or privacy is resolved).

Figure 8:
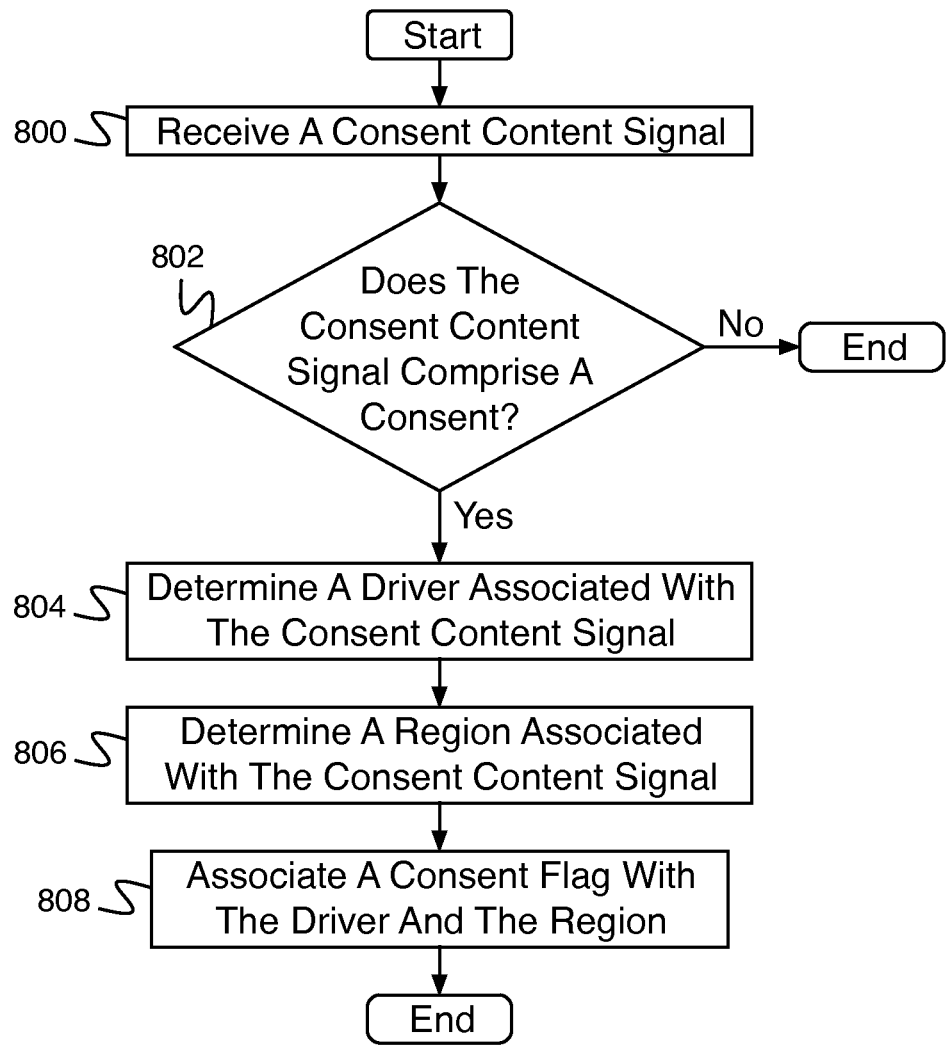
FIG. 8 is a flow diagram illustrating an embodiment of a process for determining a consent flag.

FIG. 8 is a flow diagram illustrating an embodiment of a process for determining a consent flag. In some embodiments, the process of FIG. 8 is executed by a vehicle data server (e.g., vehicle data server 104 of FIG. 1). In the example shown, in 800, a consent content signal is received. In some embodiments, a consent content signal is received from a consent recording system after a process for recording a consent. In some embodiments, the consent content signal is stored (e.g., on the vehicle data server). In 802, it is determined whether the consent content signal comprises a consent. In some embodiments, it is automatically determined whether the consent content comprises a consent (e.g., by analyzing the signal to automatically determine whether the words spoken comprise a consent). In the event it is determined that the consent content signal does not comprise a consent, the process ends. In the event it is determined that the consent content signal comprises a consent, control passes to 804. In 804, a driver associated with the consent content signal is determined. In some embodiments, a driver associated with the consent content signal is determined using one or more of a driver log, a vision system, a driver ID card, a voice recognition system, or any other appropriate driver information. In some embodiments, determining a driver comprises determining a driver ID. In 806, a region associated with the consent content signal is determined. In various embodiments, the region is determined based at least in part on a vehicle location (e.g., the location of the vehicle when the consent was recorded), on a driver indicated region (e.g., the region the driver wishes to give consent for), on a driver home location, or on any other appropriate location information. In 808, a consent flag is associated with the driver and the region.

Figure 9:
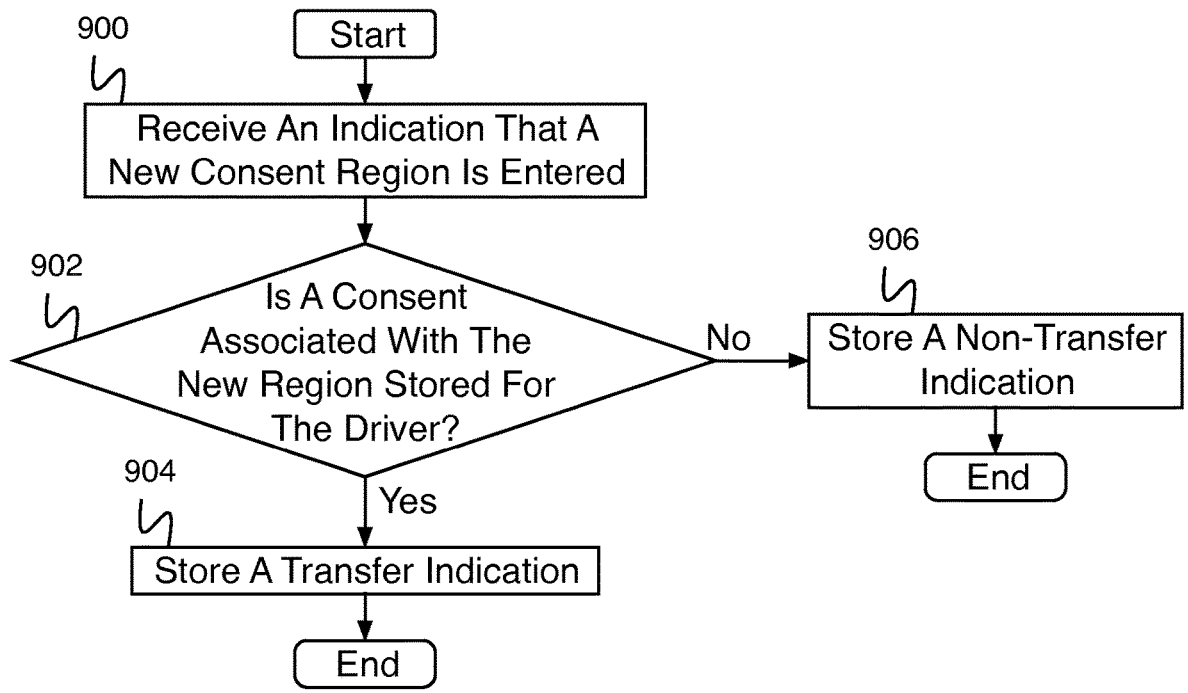
FIG. 9 is a flow diagram illustrating an embodiment of a process for checking video consent when a new consent region is entered.

FIG. 9 is a flow diagram illustrating an embodiment of a process for checking video consent when a new consent region is entered. In some embodiments, the process of FIG. 9 is executed by a vehicle event recorder (e.g., vehicle event recorder 200 of FIG. 2). In the example shown, in 900, an indication that a new consent region is entered is received. In some embodiments, the indication is received from a vehicle data server (e.g., vehicle data server 104 of FIG. 1). In some embodiments, the indication is received from a sensor interface (e.g., an interface to a GPS (e.g., global position system)). In 902, it is determined whether a consent associated with the new region is stored for the driver. In some embodiments, it is determined whether a consent is stored for the driver by determining whether a driver consent indication associated with the new region is stored on the vehicle event recorder. In some embodiments, it is determined whether a consent is stored for the driver by querying the vehicle data server for a consent associated with the new region stored for the driver. In the event it is determined that a consent associated with the new region is stored for the driver, control passes to 904. In the event it is determined that a consent associated with the new region is not stored for the driver, control passes to 906. In 906, a non-transfer indication is stored, and the process ends. In 904, a transfer indication is stored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for checking consent, comprising:
an inward facing camera including a mechanical shutter;
an input interface to:
  receive a start indication of a driver shift start; and
a processor to:
  determine a driver for the driver shift;
  receive an indication that a consent region is entered based at least in part on a current geographical location of a vehicle;
  determine whether a consent is stored for the driver for the consent region, wherein the consent is associated with a first consent region or a second consent region, wherein the first consent region corresponds to a first country, wherein the second consent region corresponds to a second country, and wherein the determining of whether the consent is stored for the driver comprises to:
    query, via a wireless network or a cellular network, an external vehicle data server for the consent; and
    in response to a determination that the consent is stored for the driver in the external vehicle data server, determine that the consent is stored for the driver;
  in the event a consent is stored for the driver for the consent region, store a transfer indication, wherein the transfer indication indicates that interior video is permitted to be transferred;
  in the event a consent is not stored for the driver:
    store a non-transfer indication, wherein the non-transfer indication indicates that interior video is not permitted to be transferred;
    prompt the driver to say a consent content according to a displayed script of the consent content to be spoken by the driver for the determined consent region;
    record a video consent content signal of the driver saying the consent content;
    verify that the recorded video consent content signal is valid-ink valid, including to:
      after the video consent content signal has been recorded:
        identify words spoken by the driver in the recorded video consent content signal;
        determine whether the spoken words match correct words for the consent content; and
        in response to a determination that the spoken words match the correct words for the consent content, determine that the recorded video consent content signal is valid;
    in response to the consent content signal being valid, store, via the wireless network or the cellular network, the consent content signal and an association with the consent region in the external vehicle data server;
  in the event a non-transfer indication is stored for the driver, close the mechanical shutter;
  receive an indication that a new consent region is entered;
  determine whether a consent is stored for the driver for the new consent region, wherein the new consent region relates to another consent region; and
  in response to a determination that the consent is not stored for the driver for the new consent region, indicate a non-transfer indication is stored for the driver.

2. The system of claim 1, wherein the input interface is further to receive a record indication to record consent.

3. The system of claim 2, wherein the record indication comprises a button push, a special button push, or an indication to an external device.

4. The system of claim 2, further comprising an output interface to provide a start record indication to start recording consent.

5. The system of claim 4, wherein the output interface is further to provide a consent content.

6. The system of claim 5, wherein the consent content is specific to a region.

7. The system of claim 1, wherein the input interface is further to receive a consent content signal of the driver saying the consent content.

8. The system of claim 1, wherein the consent content signal is stored.

9. The system of claim 8, wherein the consent content signal comprises one or more of an audio signal and a video signal.

10. The system of claim 1, wherein the consent content signal is transferred.

11. The system of claim 10, wherein the consent content signal is stored on a server.

12. The system of claim 10, wherein a consent flag is determined based at least in part on the consent content signal.

13. The system of claim 12, wherein the consent flag is associated with a driver ID.

14. The system of claim 1, wherein the driver for the driver shift is determined using one or more of: a driver log, a vision system, a driver ID card, and a voice recognition system.

15. The system of claim 1, wherein it is determined whether consent is stored for the driver by checking a consent flag.

16. The system of claim 1, wherein the processor is further to determine whether a transfer indication is stored.

17. The system of claim 1, wherein in the event it is determined that a non-transfer indication is stored, one or more of the following is performed: video information is not stored temporarily, video information is not stored permanently, or video information is not transferred.

18. A method for checking consent in a system including an inward facing camera, comprising:
- receiving a start indication of a driver shift start;
- determining, using a processor, a driver for the driver shift;
- receiving an indication that a consent region is entered based at least in part on a current geographical location of a vehicle;
- determining whether a consent is stored for the driver for the consent region, wherein the consent is associated with a first consent region or a second consent region, wherein the first consent region corresponds to a first country, wherein the second consent region corresponds to a second country, and wherein the determining of whether the consent is stored for the driver comprises:
  - querying, via a wireless network or a cellular network, an external vehicle data server for the consent; and
  - in response to a determination that the consent is stored for the driver in the external vehicle data server, determining that the consent is stored for the driver;
- in the event a consent is stored for the driver for the consent region, storing a transfer indication, wherein the transfer indication indicates that interior video is permitted to be transferred;
- in the event a consent is not stored for the driver:
  - storing a non-transfer indication, wherein the non-transfer indication indicates that interior video is not permitted to be transferred;
  - prompting the driver to say a consent content according to a displayed script of the consent content to be spoken by the driver for the determined consent region;
  - recording a video consent content signal of the driver saying the consent content;
  - verifying that the recorded video consent content signal is valid, including:
    - after the video consent content signal has been recorded:
      - identifying words spoken by the driver in the recorded video consent content signal;
      - determine whether the spoken words match the consent content; and
      - in response to a determination that the spoken words match the correct words for the consent content, determining that the recorded video consent content signal is valid;
  - in response to the consent content signal being valid, storing, via the wireless network or the cellular network, the consent content signal and an association with the consent region in the external vehicle data server;
  - in the event a non-transfer indication is stored for the driver, instructing an inward facing camera to close a mechanical shutter of the camera;
  - receiving an indication that a new consent region is entered;
  - determining whether a consent is stored for the driver for the new consent region, wherein the new consent region relates to another consent region; and
  - in response to a determination that the consent is not stored for the driver for the new consent region, indicating a non-transfer indication is stored for the driver.

19. A computer program product for checking consent in a system including an inward facing camera, the computer program product being embodied in a non-transitory computer readable storage medium and comprising computer instructions for:
- receiving a start indication of a driver shift start;
- determining a driver for the driver shift;
- receiving an indication that a consent region is entered based at least in part on a current geographical location of a vehicle;
- determining whether a consent is stored for the driver for the consent region, wherein the consent is associated with a first consent region or a second consent region, wherein the first consent region corresponds to a first country, wherein the second consent region corresponds to a second country, and wherein the determining of whether the consent is stored for the driver comprises:
  - querying, via a wireless network or a cellular network, an external vehicle data server for the consent; and
  - in response to a determination that the consent is stored for the driver in the external vehicle data server, determining that the consent is stored for the driver;
- in the event a consent is stored for the driver for the consent region, storing a transfer indication, wherein the transfer indication indicates that interior video is permitted to be transferred;

in the event a consent is not stored for the driver:
  storing a non-transfer indication, wherein the non-transfer indication indicates that interior video is not permitted to be transferred;
  prompting the driver to say a consent content according to a displayed script of the consent content to be spoken by the driver for the determined consent region;
  recording a video consent content signal of the driver saying the consent content;
  verifying that the recorded video consent content signal is valid, including:
    after the video consent content signal has been recorded:
      identifying words spoken by the driver in the recorded video consent content signal;
      determine whether the spoken words match the consent content; and
      in response to a determination that the spoken words match the correct words for the consent content, determining that the recorded video consent content signal is valid;
  in response to the consent content signal being valid, storing, via the wireless network or the cellular network, the consent content signal and an association with the consent region in the external vehicle data server;
in the event a non-transfer indication is stored for the driver, instructing an inward facing camera to close a mechanical shutter of the camera;
receiving an indication that a new consent region is entered;
determining whether a consent is stored for the driver for the new consent region, wherein the new consent region relates to another consent region; and
in response to a determination that the consent is not stored for the driver for the new consent region, indicating a non-transfer indication is stored for the driver.

20. The system of claim 1, wherein the transfer indication indicates that interior video is permitted to be transferred in response to detection of an anomalous vehicle event including at least one of a stop, turn, corner meeting a threshold speed.

21. The system of claim 1, wherein the consent includes an authorization to record driver image, driver video, driver audio, or any combination thereof.

* * * * *